Jan. 3, 1967 D. H. BLACK 3,295,791
STORAGE CONTAINER MOUNTING FOR SPACE VEHICLES
Filed Dec. 11, 1964 2 Sheets-Sheet 2

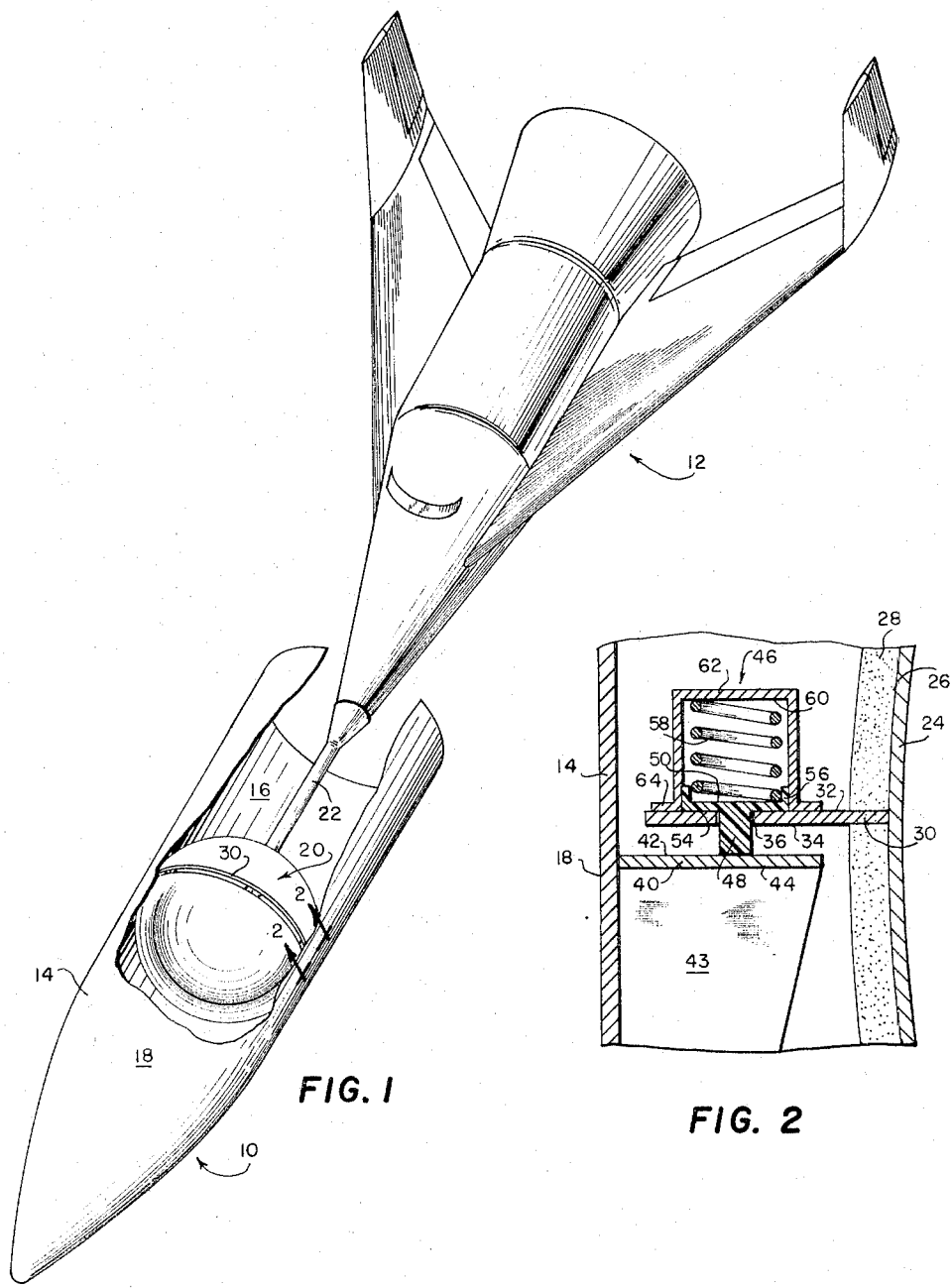

INVENTOR.
DOLPHUS H. BLACK

BY
James O. Harrell
ATTORNEYS

3,295,791
STORAGE CONTAINER MOUNTING FOR SPACE VEHICLES
Dolphus H. Black, Arab, Ala., assignor to the United States of America as represented by the Administrator of the National Aeronautics and Space Administration
Filed Dec. 11, 1964, Ser. No. 417,846
9 Claims. (Cl. 244—1)

The invention described herein may be manufactured and used by or for the Government of the United States of America for governmental purposes without the payment of any royalties thereon or therefor.

The present invention relates generally to a vehicular storage system and more particularly to a technique for mounting a storage container on a vehicle to be used in outer space.

In the future exploration of outer space, it will become necessary to provide for the storage of liquids, such as cryogenic and other types of fuels, at some distant location in outer space so that a space vehicle may be refilled or refueled during its prolonged flight to another planet. One of the most feasible methods which has been proposed for so storing these liquids is to mount a filled storage container on a tanker-type space vehicle and place it in an orbit above the earth's atmosphere with a rocket booster. The liquid in this storage container can then be transferred readily from the orbital tanker vehicle to the chase vehicle needing refillment by any well known rendezvous technique.

In order to keep these liquids stored in the orbital tanker vehicle at extremely low temperatures with minimum evaporation or boil-off, the storage containers will have to be well insulated. Modern insulation techniques now being used to insulate storage containers are effective to minimize the evaporation or boil-off of these liquids, but the overall effectiveness of these insulation techniques will be hampered to quite an extent due to the large amount of heat which will be transferred from the outer skin or body surface of the orbital tanker vehicle into the liquid through the mounting means for the storage container. This problem of heat transfer in the tanker vehicle is considered to be critical in view of the extremely high temperatures which will be encountered as it orbits the earth. Thus, there is the utmost need to advance the technology pertaining to the mounting of storage containers to a point where such is compatible with the advancements which have been made in the insulation techniques now being used to insulate the storage containers themselves, in order to obtain an optimum storage system for use in outer space.

The conventional techniques used to mount a storage container on a vehicle, such as, for example, welding or otherwise rigidly securing the container on the body of the vehicle, are not deemed suitable where certain type of liquids are being stored since such techniques provide large contact surfaces through which heat is transferred readily into the liquid. Proposals have been made to utilize various types of conventional insulated mounting devices so as to cut down on this large amount of heat transfer but they are inefficient and also present the disadvantages of being bulky, heavy in weight and relatively expensive to install. It has also been suggested that the storage container be suspended from the body of the orbiting tanker vehicle by using net ararngements or similar types of suspension devices. However, suspending the storage container in such a manner would have the disadvantage of increasing the overall weight of the tanker vehicle, rendering the storage container unstable and compressing or otherwise damaging the insulation on the storage container.

In accordance with the present invention, it has been found that the many difficulties and disadvantages presented by the conventional types of mounting means discussed above may be overcome by providing a mounting technique which results in there being very small contact surfaces between the body of the orbital tanker vehicle and the storage container; thereby eliminating any appreciable amount of heat which might be transferred through the mounting means for the storage container. This mounting technique provides these small contact surfaces as the result of a unique mounting construction which takes advantage of the weightless conditions existing in outer space. This construction consists, in general, of the following basic parts; (1) a first supporting element connected to the body of a tanker vehicle, (2) a second supporting element connected to a storage container and normally being in engagement with the first supporting element, and (3) force applying devices for automatically disengaging the first and second supporting elements when the tanker vehicle and the storage container reach a point in outer space where there are substantially no gravitational forces. The first and second supporting elements provide large contact surfaces which are required to adequately support the storage container on the body of the tanker vehicle prior to as well as during the launching of the vehicle by a rocket booster. After the force applying devices cause the first and second supporting elements to be disengaged, there remains only small contact surfaces between the body of the tanker vehicle and the storage container through which heat may be transferred. These small contact surfaces result from the first and second supporting elements being separated and indirectly connected to each other through the force applying devices. The force applying devices may also be constructed of material with low heat conducting properties so as to further minimize the amount of heat transferred therethrough. Positioning pins are also provided on the supporting elements so as to stabilize the storage container and keep it in a proper position with respect to the tanker vehicle.

Accordingly, it is an object of this invention to provide a unique technique for mounting a storage container on a space vehicle which takes advantage of the weightless conditions existing in outer space.

It is also an object of this invention to provide a mounting for a storage container which eliminates any appreciable amount of heat which might be transferred therethrough.

Another object of the present invention is to provide a mounting which also serves as an insulation between the body of a tanker vehicle and the storage container mounted thereon.

A further object of this invention is to provide a mounting for a storage container which is easy to construct and install, and results in a considerable saving in maintenance cost and manpower.

Other objects and advantages of this invention will become more apparent from a reading of the following detailed description and appended claims taken in conjunction with the accompanying drawings wherein:

FIGURE 1 is a perspective view showing tanker and chase vehicles rendezvousing in outer space with a portion of the tanker vehicle cut away to disclose the storage container mounted therein;

FIGURE 2 is an enlarged, cross sectional view taken substantially along a plane indicated by line 2—2 in FIGURE 1;

Figure 3:
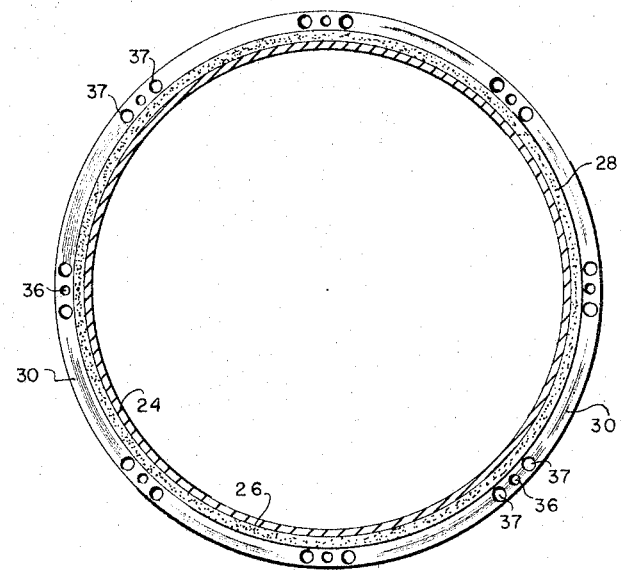
FIGURE 3 is a cross sectional view taken through approximately the middle of the storage container.

For a better understanding of the construction and use of the present invention, the novel mounting technique will be described specifically in connection with the mounting of a storage container on a tanker vehicle to be used in outer space. However, it is to be understood that this mounting technique is not to be limited for use with storage containers only but may obviously be used to mount any kind of structure on a vehicle.

Referring now in more detail to the drawing wherein like reference numerals designate identical or corresponding parts throughout the several views, and with special attention to FIGURE 1, reference numerals 10 and 12 generally designate tanker and chase vehicles, respectively, rendezvousing in outer space. The tanker vehicle 10 has a body 14 consisting of inner and outer surfaces 16 and 18, respectively. Mounted on the inner surface 16 of the body 14 is a storage container designated generally by reference numeral 20. The fuel stored in the storage container 20 may be transferred to the chase vehicle 12 through a connection tube 22 by using well known rendezvous techniques.

As is shown in FIGURES 2 and 3, the storage container 20 comprises a spherical shell 24 having an outer surface 26 which is covered by an insulation 28. The insulation 28 may be composed of any suitable material which is presently being used to insulate tanks adapted to store cryogenic fuels. A supporting flange or ring 30 is secured to the outer surface 26 of the spherical shell 24 and extended outwardly beyond the insulation 28. The supporting ring 30, as shown in FIGURE 2, has upper and lower surfaces 32 and 34, respectively. The supporting ring 30 is also provided with a plurality of holes 36 and 37 which will be discussed more in detail hereinafter.

On the inner surface 16 of the tanker body 14, there is secured an inwardly extending supporting flange or ring 40. As shown in FIGURE 2, the supporting ring 40 has upper and lower surfaces 42 and 44, respectively. For purposes of reinforcing the supporting ring 40, a plurality of triangle-shaped shear plates 43 are secured to the inner surface 16 of the tanker body 14 and the lower surface 44 of the supporting ring 40. The upper surface 42 of the supporting ring 40 and the lower surface 34 of the supporting ring 30 are arranged in such a manner as to normally permit engagement with each other.

Figure 4:
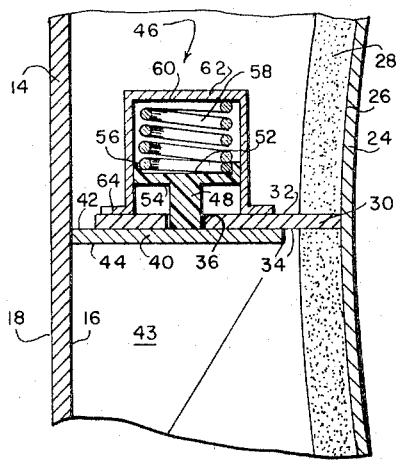
FIGURE 4 is a cross sectional view showing the normal position of the tank mounting prior to the tanker vehicle being placed in orbit.

As shown in FIGURES 2 and 4, a force applying device designated generally by reference numeral 46 is adapted to separate slightly the lower surface 34 of the supporting ring 30 and the upper surface 42 of the supporting ring 40. The force applying device 46 includes a plunger element 48 having the lower end thereof connected to or resting on the upper surface 42 of the supporting ring 40 and the upper end thereof extended through the hole 36 in the supporting ring 30. Integrally formed with the upper end of the plunger element 48 is a support flange 50 having upper and lower surfaces 52 and 54, respectively. The plunger element 48 and support flange 50 are constructed from material having low heat conducting properties, such as, for example, Teflon. The support flange 50 is circular in shape and has a vertically extending lip 56 formed integrally with the outer edge thereof. The lower end of a coiled spring 58 is supported by the upper surface 52 of the support flange 50 and is retained in place by the lip 56. The upper end of the coiled spring 58 engages a surface 60 on a cylindrically shaped enclosure element 62 which encloses the coiled spring 58. It is understood that any type of energy storing means other than a coiled spring may also be employed for actuating the plunger element 48. The lower end of the enclosure element 62 is connected to the supporting ring 30 by having an outwardly extending flange 64 thereon welded or otherwise secured to the upper surface 32.

As illustrated in FIGURE 4, the coiled spring 58 is normally compressed by the plunger element 48 within the enclosure element 62 when the surface 34 of the ring supporting 30 and the surface 42 of the ring supporting 40 are in contact with each other. Any number of force applying devices may obviously be provided between the supporting rings 30 and 40. In FIGURE 3, a sufficient number of the holes 36 are provided in the supporting ring 30 to accommodate eight of the force applying devices 46. Adjacent each of the holes 36 are two holes 37 for accommodating two positioning pins 66 which maintain the storage container 20 in its proper position by preventing the supporting rings 30 and 40 from shifting relative to each other.

Figure 5:
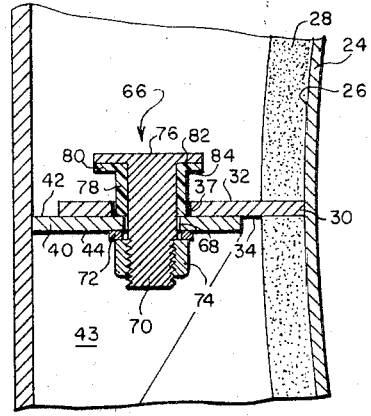
FIGURE 5 is a cross sectional view showing the positioning pin for stabilizing the storage container on the body of the tanker vehicle.

As more clearly shown in FIGURE 5, each of the holes 37 is in alignment with a slightly smaller hole 68 in the supporting ring 40. The positioning pin 66 has a shank portion 70 which is extended through the holes 37 and 68. The lower end of the shank portion 70 is threaded and adapted to receive a standard washer 72 and threaded nut 74. The upper end of the shank portion 70 has a head portion 76 integrally formed therewith. A Teflon sleeve 78 surrounds the shank portion 70 and fits within the hole 37 formed in the supporting ring 30. The lower end of the sleeve 78 engages a small portion of the surface 42 of the ring 40 adjacent the hole 68. The upper end of the sleeve 78 has an outwardly extending flange 80 formed integrally therewith. The flange 80 has upper and lower surfaces 82 and 84, respectively. The upper surface 82 engages the bottom surface on the head portion 76 of the positioning pin 66. The small portion of the surface 32 adjacent hole 37 engages the lower surface 84 of the flange 80 when the rings 30 and 40 are separated. The sleeve 78 may obviously be constructed of any type of material having low heat conducting properties.

The operation of the unique mounting technique of the instant invention will now be summarized. Prior to and during launching of the tanker vehicle 10 into an orbit above the earth's atmosphere, the storage container 20 is mounted thereon by having the large surface 34 of the supporting ring 30 in engagement with the large surface 42 of the supporting ring 40 and the coil springs 58 of the force applying devices 46 are compressed in the manner shown in FIGURE 4. When the tanker vehicle reaches an orbit where weightless conditions exist, the coil springs 58 move the plungers 48 with respect to the enclosure 62 thereby causing the supporting rings 30 and 40 to be separated and the large surfaces 34 and 42 to be out of contact with each other, as shown in FIGURE 2. With the supporting rings 30 and 40 so separated, the surface 32 of the supporting ring 30 is engaged with the surface 54 of the support flange 50 and the surface 84 of the flange 80; thereby providing small contact surfaces which minimize the amount of heat transferred from the outer skin 18 of the tanker vehicle 10 into the liquid stored within the storage container 20.

To those having experience in the art of insulating storage containers or tanks for cryogenics and other low temperature liquids, it can be readily seen that the mounting technique of the present invention, which takes advantage of the weightless conditions existing in outer space, constitutes a very effective and efficient means for preventing an undesirable amount of heat from being transferred into the stored liquid through the mounting means for the storage container.

Obviously numerous modifications and variations of the present invention are possible in light of the above teachings. It is, therefore, to be understood that within the scope of the appended claims, the invention may be practiced otherwise than as specifically described and illustrated.

What is claimed is:

1. A space vehicle adapted to be placed in an orbit above the earth's atmosphere comprising, in combination:
(a) a body having inner and outer surfaces;
(b) a liquid storage container adapted to be supported on said body;
(c) a first supporting means on said inner surface of said body;
(d) a second supporting means on said liquid storage container;
(e) said first and second supporting means being in engagement with each other due to the action of gravity; and
(f) a force applying means for automatically disengaging said first and second supporting means when said space vehicle reaches an orbital position above the earth's atmosphere where there are substantially no gravitational forces, thereby minimizing the amount of heat transferred from said outer surface of said body to the liquid stored in said liquid storage container.

2. A space vehicle as defined in claim 1 which further comprises means for stabilizing and positioning said liquid storage container on said body.

3. A space vehicle as defined in claim 1 wherein:
(a) said first supporting means consists of a first ring connected to said inner surface of said body;
(b) said second supporting means consists of a second ring connected to and surrounding said liquid storage container.

4. A space vehicle as defined in claim 3 which further comprises:
(a) pin elements extended through aligned holes in said first and second rings;
(b) one end of each of said pin elements having a head portion formed integrally therewith;
(c) the other end of each of said pin elements having a securing means thereon;
(d) a sleeve surrounding each of said pin elements;
(e) one end of said sleeve extended through the respective hole in said second ring, and engaged with said first ring; and
(f) the other end of said sleeve engaged with said head portion.

5. A space vehicle as defined in claim 4 wherein said sleeve is constructed from a material having low heat conducting properties.

6. A space vehicle as defined in claim 3 wherein said force applying means includes:
(a) a plurality of plunger elements extended through holes formed in said second ring;
(b) one end of each of said plurality of plunger elements engaged with said first ring;
(c) the other end of each of said plurality of plunger elements having a support flange engaged with an energy storing element;
(d) said support flange adapted to be engaged by said second ring when said first and second rings are disengaged.

7. A space vehicle as defined in claim 6 wherein said energy storing element includes:
(a) a coiled spring having one end thereof engaged with said support flange; and
(b) the other end of said coiled spring engaged with an enclosure element connected to said second ring.

8. A space vehicle as defined in claim 6 wherein said plurality of plunger elements are constructed from a material having low heat conducting properties.

9. A space vehicle adapted to be placed in an orbit above the earth's atmosphere comprising; in combination:
(a) a cylindrical body having inner and outer surfaces;
(b) a spherical storage container adapted to be supported on said cylindrical body;
(c) a first supporting ring connected to said inner surface of said cylindrical body;
(d) a second supporting ring connected to and surrounding said spherical storage container;
(e) a plurality of plunger elements extended through holes formed in said second supporting ring;
(f) one end of each of said plurality of plunger elements engaged with said first supporting ring; and
(g) the other end of each of said plurality of plunger elements having a support flange engaged with a coiled spring enclosed in an enclosure element connected to said second supporting ring;
(h) said first and second supporting rings being in engagement with each other and said coiled springs being compressed within said enclosure elements due to the action of gravity;
(i) said coiled springs automatically moving said plurality of plunger elements relative to said enclosure elements to disengage said first and second supporting rings and cause said second supporting ring to engage said support flanges when said space vehicle reaches an orbital position above the earth's atmosphere where there are substantially no gravitational forces, thereby minimizing the amount of heat transferred from said outer surface of said cylindrical body to said spherical storage container.

References Cited by the Examiner

UNITED STATES PATENTS 2,977,080  3/1961  Von Zborowski _____ 244—2 X
3,176,933  4/1965  Clemmons _____ 244—1

FERGUS S. MIDDLETON, *Primary Examiner.*